United States Patent
Babcock et al.

(10) Patent No.: US 6,762,579 B2
(45) Date of Patent: Jul. 13, 2004

(54) POSITION ADJUSTING SYSTEM FOR A SEAT OF A VEHICLE

(75) Inventors: Bryce W. Babcock, Saline, MI (US); Russell E. Monahan, Ann Arbor, MI (US); William V. Alcini, Ypsilanti, MI (US)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 10/161,517

(22) Filed: Jun. 3, 2002

(65) Prior Publication Data

US 2003/0222613 A1 Dec. 4, 2003

(51) Int. Cl.[7] ................................................. H02P 7/00
(52) U.S. Cl. ....................... 318/445; 318/446; 318/280; 248/429; 297/344.1
(58) Field of Search ................. 318/445, 466–469, 318/280, 446, 291; 248/424, 425, 429, 430, 423; 297/344.1–344.26; 296/65.01

(56) References Cited

U.S. PATENT DOCUMENTS

| | | | |
|---|---|---|---|
| 2,076,828 A | | 4/1937 | Swartz |
| 2,209,122 A | | 7/1940 | Houplain |
| 2,812,044 A | | 11/1957 | Cole, Jr. |
| 2,993,569 A | | 7/1961 | Cole, Jr. |
| 3,232,124 A | | 2/1966 | Weber |
| 3,243,023 A | | 3/1966 | Boyden |
| 3,741,513 A | * | 6/1973 | Wilson .................. 248/429 |
| 4,177,887 A | | 12/1979 | Kellett et al. |
| 4,284,935 A | * | 8/1981 | March et al. ............ 318/280 |
| 4,706,791 A | | 11/1987 | Magliano |
| 5,105,924 A | | 4/1992 | Carlson |
| 5,545,109 A | * | 8/1996 | Hayakawa ............... 477/178 |
| 5,588,517 A | * | 12/1996 | Kooy et al. ............. 192/70.25 |
| 5,896,973 A | | 4/1999 | Hochmuth et al. |
| 6,260,685 B1 | | 7/2001 | Montanana |
| 6,273,233 B1 | | 8/2001 | Denis |
| 6,288,464 B1 | | 9/2001 | Torii et al. |
| 6,412,618 B1 | * | 7/2002 | Stretch et al. ............ 192/35 |

* cited by examiner

*Primary Examiner*—Kimberly Lockett
*Assistant Examiner*—Renata McCloud
(74) *Attorney, Agent, or Firm*—Brinks Hofer Gilson & Lione (57) ABSTRACT

A position adjusting system for adjusting the position of a seat n a vehicle and preventing movement of the seat resulting from external forces acting on the seat. The system includes a seat track fixable to the vehicle, a motor actuator, and a gear train engaged with the motor actuator. The seat track is adapted to cooperate with the seat track to convert movement of the motor actuator into movement of the seat track and the seat. A non-reversing clutch mechanism is coupled with the gear train and adapted to transfer torque from the motor actuator through the gear train to move the seat upon actuation of the motor actuator but locking upon torque being applied through the seat track, thereby preventing the external forces acting on the seat from moving the seat relative to the vehicle.

22 Claims, 9 Drawing Sheets

POSITION ADJUSTING SYSTEM FOR A SEAT OF A VEHICLE

TECHICAL FIELD

This invention relates generally to a power adjuster system for seats of motor vehicles, and more particularly to a mechanism within such a system that prevents forces applied to the seat in a vehicle collision from being restrained entirely by the drive motor of the system.

BACKGROUND

Automotive power driven seat mechanisms are well known in the art. A typical power adjuster seat mechanism uses a worm gear driven by a motor connected to a rack and pinion to produce fore-and-aft movement of the seat. The typical current design of these systems relies on the geometry and internal friction of the gear drive to maintain the seat set in a desired position when it is not being moved.

The requirements of these products presents two conflicting design constraints. First, in order to keep an external load on the seat, such as that encountered in a vehicle collision, from moving the seat by "back driving" the worm gear and drive motor, it has been necessary to use a relatively high gear reduction ratio. The high reduction ratio provides a high degree of friction. However, using a high gear ratio causes the rate of powered movement of the seta to be limited. Decreasing the gear tends to increase the speed with which the powered seat is capable of moving, but it also results in undesirable movement of the seat upon application of external forces to the seat. These concerns are especially significant with so-called integrated structural seats, which have belt restraint anchorages on the seat structure, and therefore, the seat which is movable on its tracks absorbs all restraint loadings. In short, past designs have had to sacrifice adjustment speed for rigidity and vice versa. Therefore, there is a need in the automotive industry for a seat power adjuster system that is rigid enough to withstand the application of high external forces, yet is capable of moving the seat relatively rapidly.

SUMMARY OF THE INVENTION

In accordance with the present invention, a power adjuster system is provided with an internal non-reversing clutch mechanism. The clutch mechanism is integrated into the power adjuster dear drive train. When the clutch is driven by the motor actuator to adjust seat position in either the fore or the aft directions, the clutch mechanism allows free rotation and driving engagement with the seat. If however, a high level of external force is acting on the seat, the clutch mechanism locks, transferring these loads directly to the seat track or other mounting structural member. Since the clutch is located between the seat and the drive motor actuator, locking of the clutch transfers forces away from the motor actuator. Since the motor drive system does not have to be designed with sufficient friction to withstand inertial or other external loads applied to the seat, that system can be optimized for its function of allowing position changes for the seat.

Additional benefits and advantages of the present invention will become apparent to those skilled in the art to which the present invention relates from the subsequent description of the preferred embodiment and the appended claims, taken in conjunction with the accompanying drawings.

DETAILED DESCRIPTION OF THE PREFERRED EMBODIMENT

The following description of the preferred embodiment of the invention and the preferred method of supplying the invention are not intended to limit the scope of this invention to these preferred embodiments and methods, but rather to enable any person skilled in the art of clutch mechanisms to make and use this invention.

Figure 1:
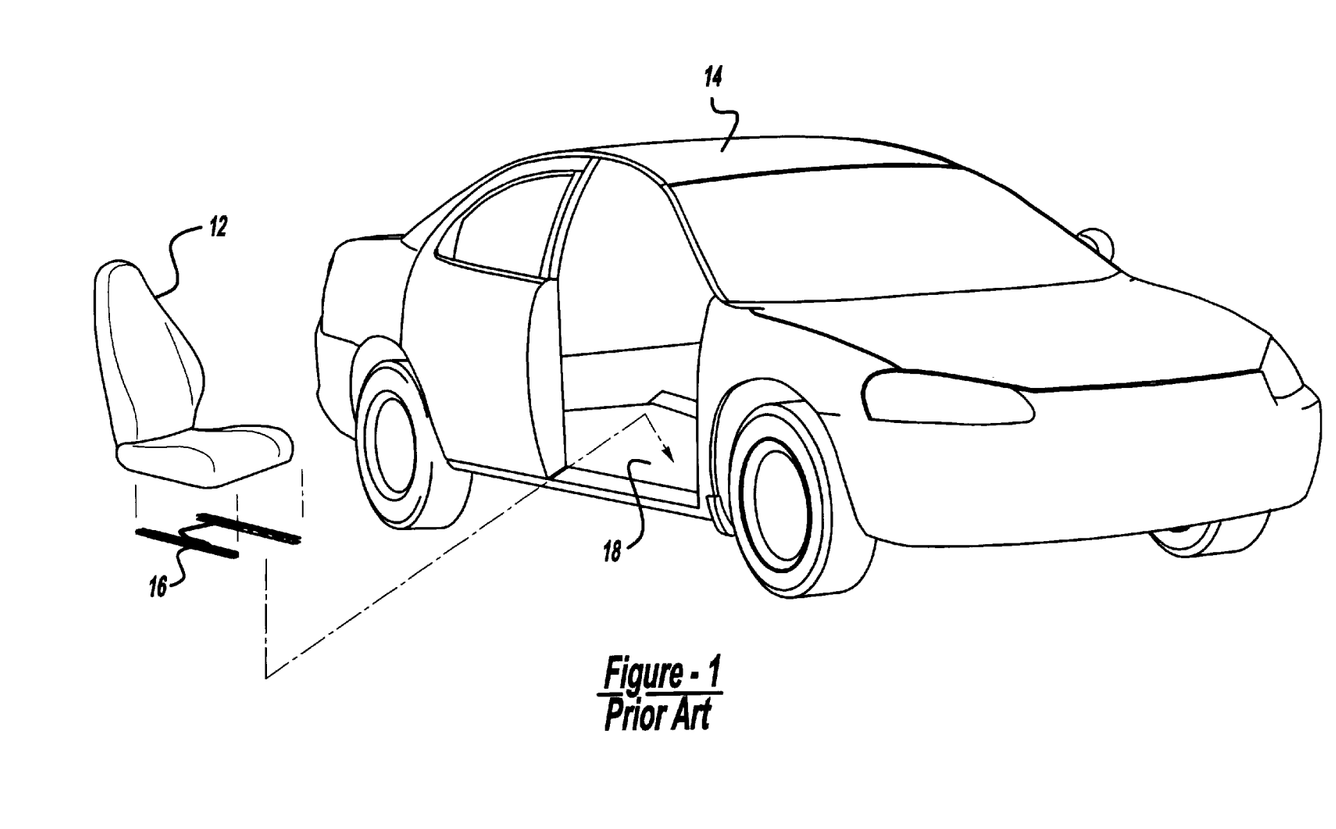
FIG. 1 is a perspective view, of a vehicle showing the seat and the seat track of a prior art design.

Now with reference to FIG. 1, the environment of application of the present invention is illustrated. As shown in that figure, seat 12 of vehicle 14 is shown mounted to seat track 16. These components are in turn mounted to a floor pan 18 of vehicle 14.

Figure 2:
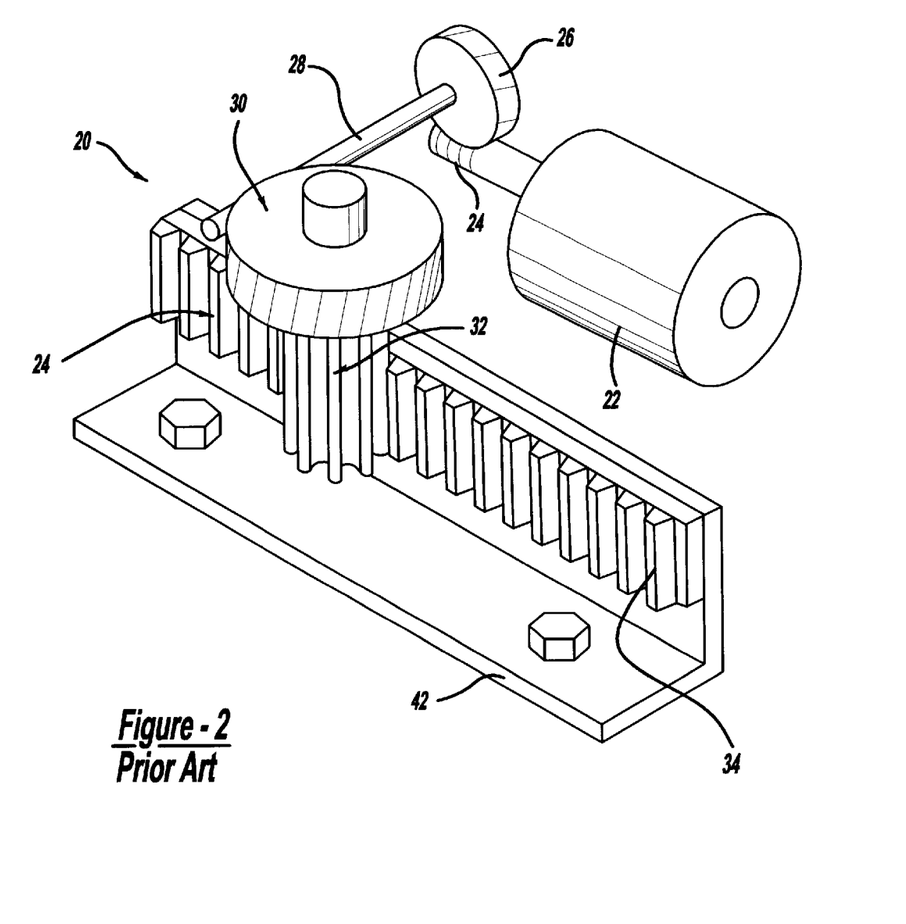
FIG. 2 is a perspective view of a prior art seat adjuster system.
Figure 3:
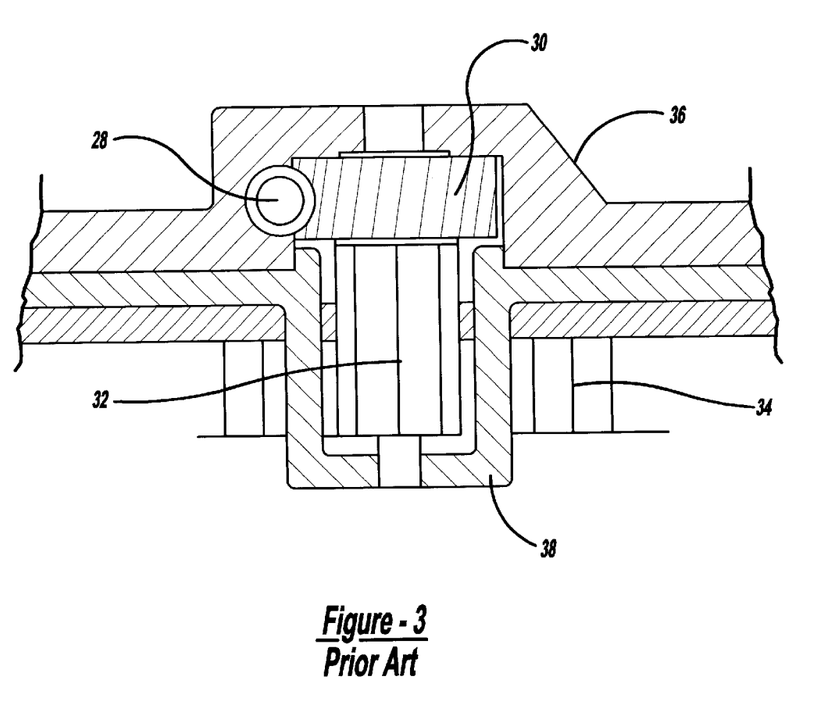
FIG. 3 is a cross-sectional view of a prior art seat adjuster system.

Now with reference to FIGS. 2 and 3, a power adjuster system 20 in accordance with a prior art design is illustrated for causing fore-and-aft movement of a seat. Power adjuster system 20 includes drive motor 22 which drives worm gear shaft 24. Worm shaft 24 drives worm wheel 26 which in turn drives worm shaft 28 which meshes with a second worm wheel 30. Worm wheel 30 in turn drives pinion dear 32 which engages with toothed rack 34. Actuation of drive motor actuator 22 causes the various components to rotate. As pinion 32 rotates, the engine system advances with respect to toothed rack 34. Drive motor 22 is bidirectional, enabling the seat position to be adjusted in the fore-and-aft direction. FIG. 3 provides a sectional view illustrating the previously described components held within upper and lower drive cases 36 and 38. Toothed rack 34 is part of seat track 16.

Figure 4:
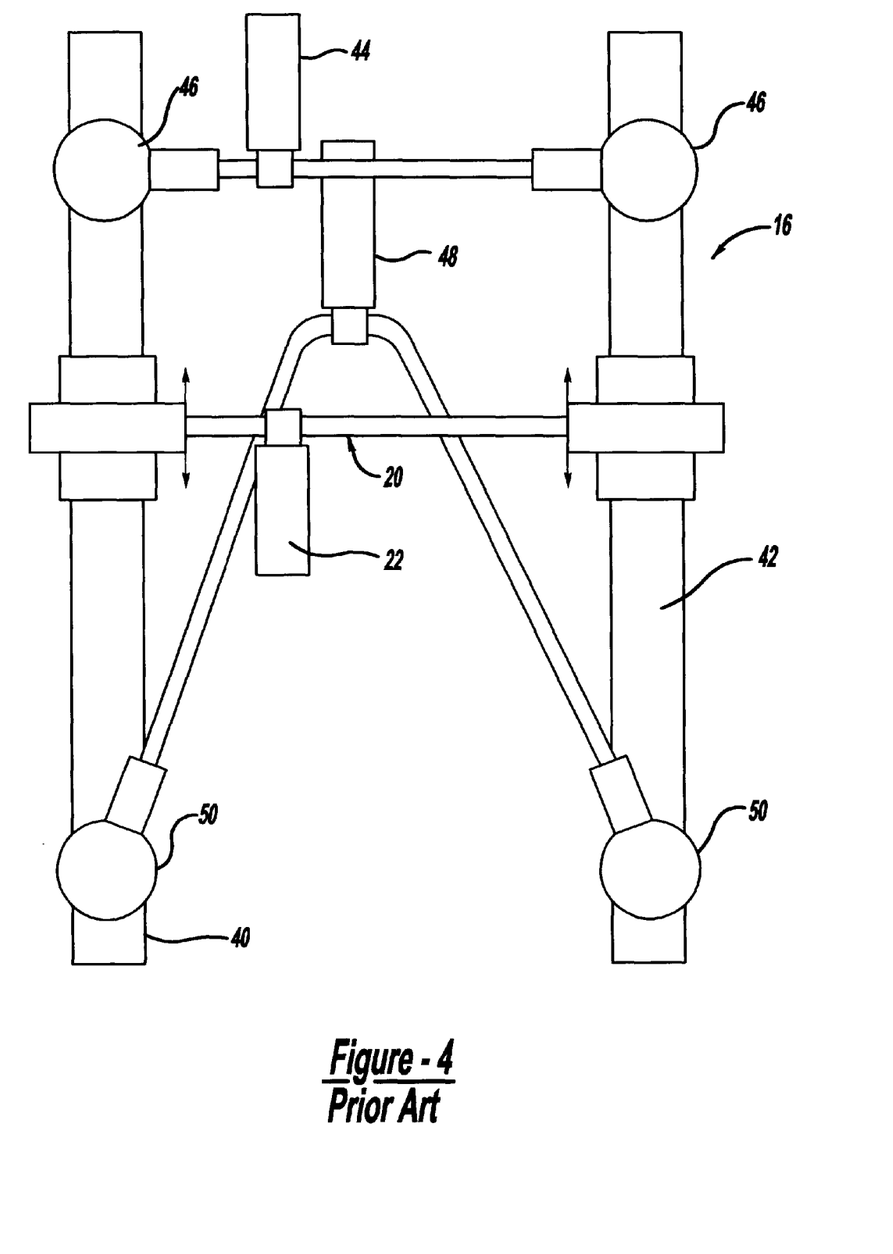
FIG. 4 is a plan view of a prior art power seat apparatus equipped to move a seat along two axes.

FIG. 4 is a further illustration of a seat track assembly in accordance with the prior art. As shown, motor 22, which was previously described, is used to cause fore-and-aft motion of the seat 12 along track rails 40 and 42. This figure further illustrates that additional motor actuators are provided for causing vertical motion of the front and rear portions of the seat 12. Motor 44 is coupled with jack screws 46 to elevate the forward portion of the seat 12, whereas motor 48 is coupled to jack screws 50 which are provided for moving the rear portion of the seat in the vertical direction.

Figure 5:
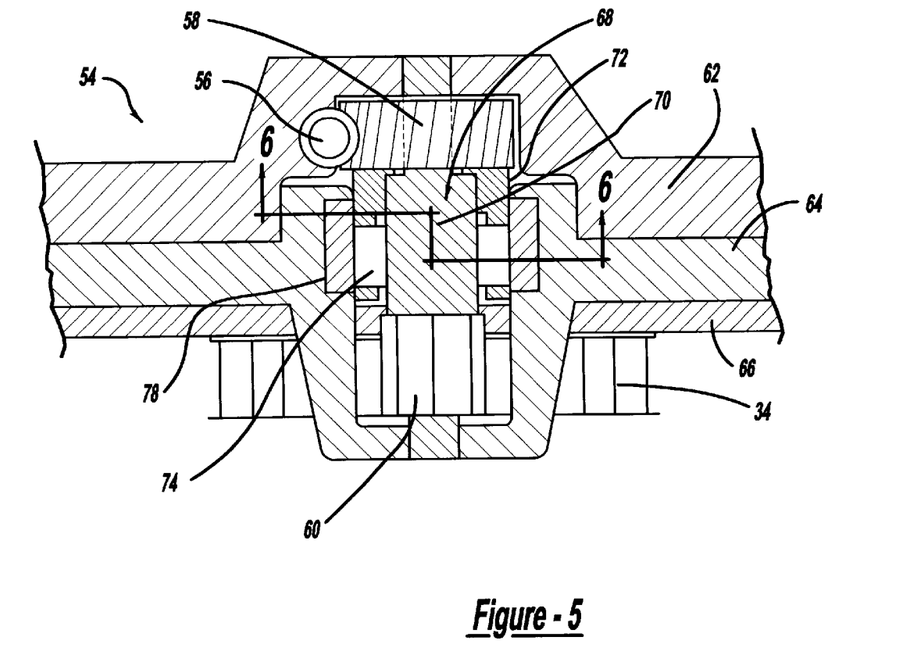
FIG. 5 is a cross-sectional view of a power seat apparatus equipped with a non-reversing clutch mechanism in accordance with this invention.
Figure 6:
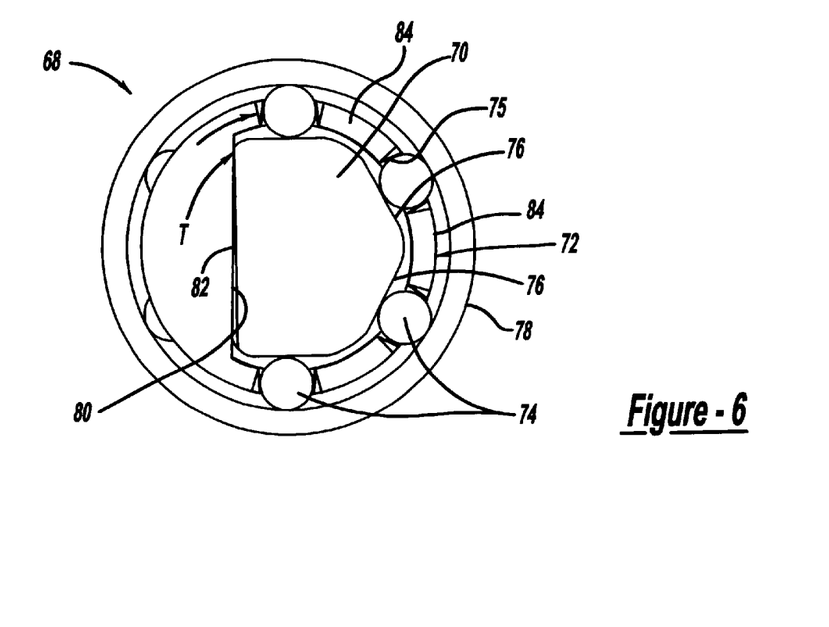
FIG. 6 is a cross-sectional view of a portion of the clutch mechanism taken along line 6—6 of FIG. 5.
Figure 7:
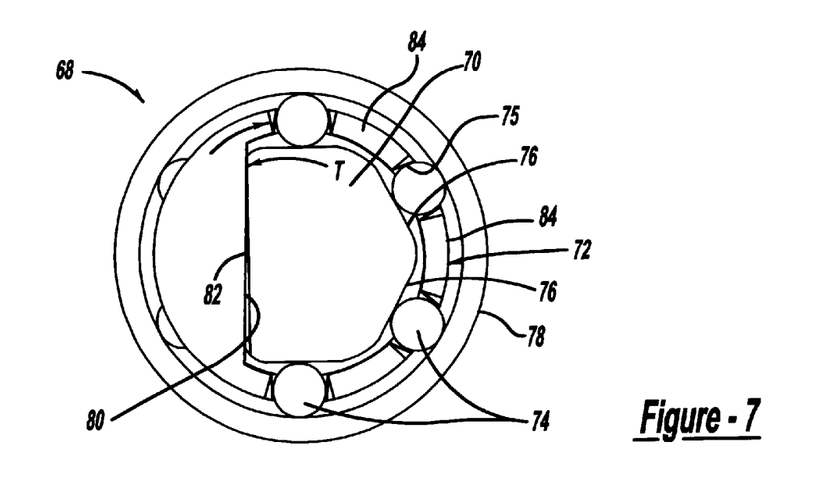
FIG. 7 is a cross-sectional view of the clutch mechanism similar to FIG. 6 showing the clutch actuated in a different mode than shown in FIG. 6.

Now with reference to FIGS. 5, 6, and 7, a position adjusting system 54 is shown in accordance with a first embodiment of this invention. Elements common to those of the prior art designs described above are hereafter identified by the previously used reference numbers. Like the prior art designs, position adjusting system 54 includes worm 56 which meshes with worm gear 58. These elements in turn drive shaft 70 and pinion 60 which meshes with toothed rack 34. These elements are held by housing components 62 and 64 and are mounted to seat frame 66. Position adjusting system 54 differs from the prior art system described previously in that it incorporates non-reversing clutch assembly 68. Non-reversing clutch assembly 68 primarily comprises shaft 70, retainer 72, rollers 74, and roller springs 75. As best shown in FIGS. 6 and 7, shaft 70 has a roughly "D" shape in cross-section in a plane above the plane of rollers 74 (the section line 6—6 of FIG. 5 is broken to cut through two parallel planes). Shaft 70 further features a number of flat cam surfaces 76 oriented to engage with each of rollers 74. Rollers 74 are trapped between shaft 70 and the inside cylindrical surface of outer race 78. Retainer 72 has an internal cavity 80 which receives shaft 70 and includes a flat abutment surface 82. Retainer 72 further forms roller tangs 84. Roller springs 75 act on rollers 74 to bias them to engage with flats 76. Non-reversing clutch assembly 68 is connected in the drive system such that worm gear 58 directly engages and drives retainer 72, whereas shaft 70 is engaged with pinion 60.

In the ordinary course of operation in moving the seat by actuation of the motor 22, the source of torque is applied onto retainer 72, and the torque is transferred to shaft 70 as shown in FIG. 6. Retainer tangs 84 and springs 75 push the rollers 74 against shaft cam surfaces 76. Rollers 74 are permitted to roll or slide freely. Thus in this operating condition, non-reversing clutch assembly 68 freely allows torque to be transferred worm gear 58 and pinion 60, and thus fore-and-aft adjustment of the seat is provided. When, however, the source of the torque is "back fed" from an external force acting on the seat, for example due to inertial loads on the seat, toothed rack 34 drives pinion 60 and shaft 70 in the opposite direction, which causes rollers 74 to be frictionally trapped between shaft cam surface 76 and outer race 78. This direction of force is shown in FIG. 7. This frictional engagement causes the shaft 70 and retainer 72 to "lock up" against outer race 78. Since outer race 78 is rigidly mounted, this lock up condition prevents further fore-and-aft movement of the seat 12 on seat track 16. These restraining loads are not born by the motor 22 or its related gear reduction components.

The interlocking geometry between retainer 72 and shaft 70 is used to transmit the torque between the two components when it is driven by motor 22. The geometry also provides a means for limiting the degree of angular rotation between retainer 72 and shaft 70 which must be sufficient so that rollers 74 are pushed fully into the position where they can engage between shaft 70 and outer race 78 when torque is applied through shaft 70. This geometry may take various alternate forms. In the form previously described as shown in FIGS. 5 through 7, the interfitting of shaft 70 and the retainer cavity 80 controls the amount of relative angular rotation.

Figure 8:
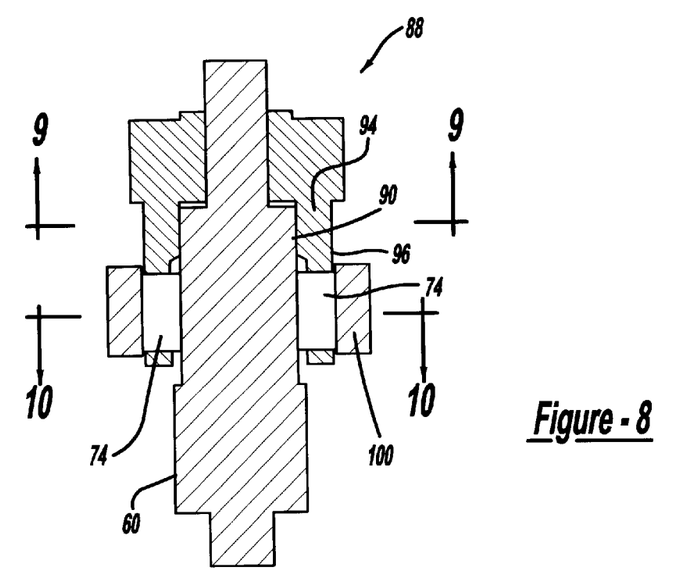
FIG. 8 is a cross-sectional view through a non-reversing clutch assembly in accordance with the second embodiment of this invention.
Figure 9:
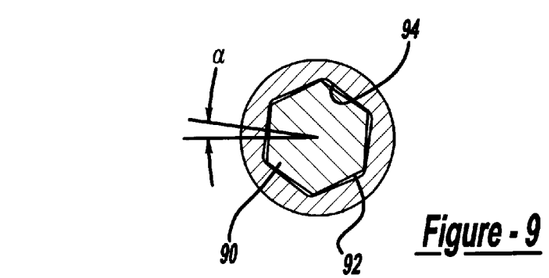
FIG. 9 is a cross-sectional view taken along line 9—9 from FIG. 8.
Figure 10:
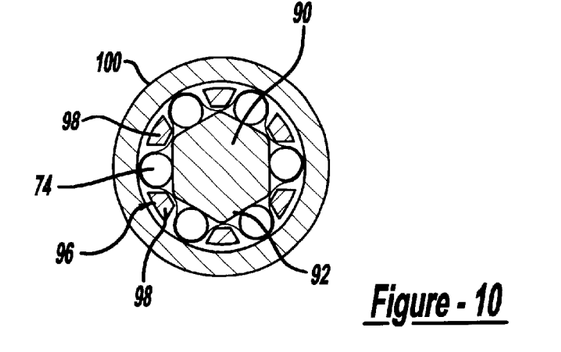
FIG. 10 is a cross-sectional view taken along line 10—10 from FIG. 8.

Now with reference to FIGS. 8, 9, and 10, a second embodiment of a non-reversing clutch assembly 88 is described. This embodiment differs in that the shaft 90 geometry is extended and engages with matching geometry with controlled clearance provided in the retainer 96 to transmit torque in the driving direction. As shown in FIGS. 9 and 10, shaft 90 has a regular polygonal shape, here in the form of a hexagon having six cam surfaces 92 which engage with rollers 74. The shape of shaft 90 is extended into a torque transmitting section 94 of retainer 96. The inter-engagement between torque transmitting section 94 and shaft 90 provides a means for limiting the degree of angular rotation between these components designated by angle $\alpha$ in FIG. 9. This inter-engagement allows driving torque to be transmitted between these two components when non-reversing clutch assembly 88 is in a disengaged or non-locking condition. Each of retainer tangs 98 are identical for each roller and are distributed around the entire perimeter of shaft 90. This embodiment operates in a manner consistent with the first embodiment. Accordingly, when torque is transmitted from an actuating motor through retainer 96, free rotation of clutch assembly 88 is provided. If, however, the shaft 90 is actuated for rotation, rollers 74 are forced into frictional locking engagement with outer race 100. It should be noted that the interfifting components 94 and 90 do not have to be configured as a polygon, numerous other non-circular shapes could be used so long as they permit limited angular rotation while permitting driving torque to be transmitted.

Figure 11:
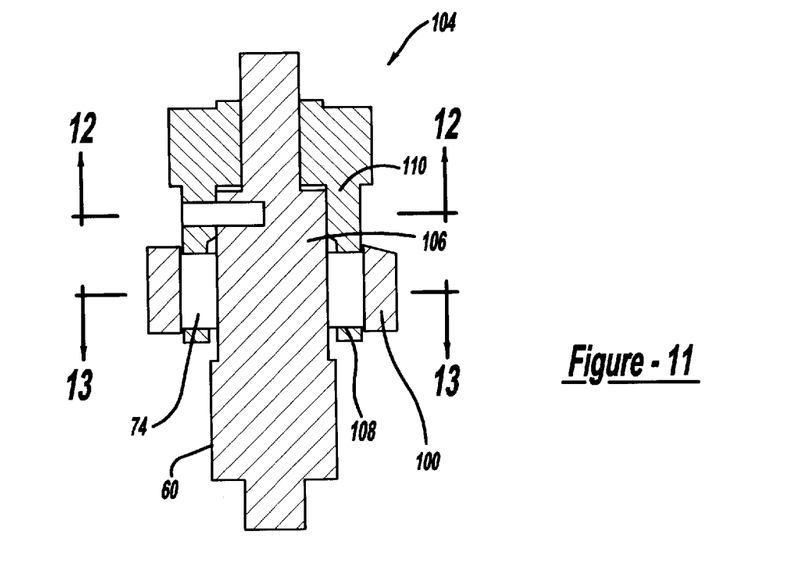
FIG. 11 is a cross-sectional view of a third embodiment of a non-reversing clutch assembly in accordance with this invention.
Figure 12:
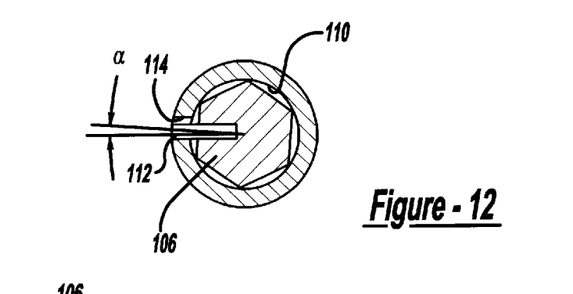
FIG. 12 is a cross-sectional view taken along line 12—12 from FIG. 11.
Figure 13:
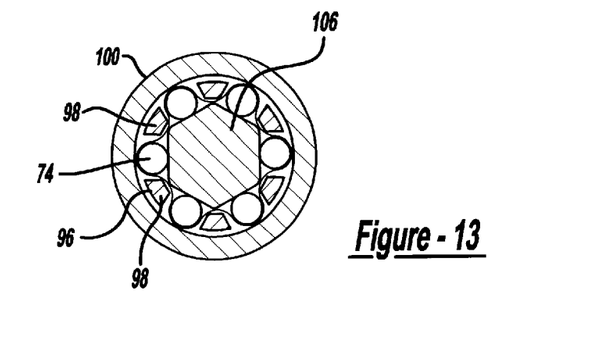
FIG. 13 is a cross-sectional view taken along line 13—13 from FIG. 11.

Now with reference to FIGS. 11, 12, and 13, a third embodiment of a non-reversing clutch assembly 104 is described. This embodiment is identical to clutch assembly 88 except with regard to the manner with which torque is transmitted between shaft 106 and retainer 108. In this instance, shaft 106 has the same six sided hexagonal shape as that of shaft 90. However, retainer torque transmitting section 110 has a smooth inside cylindrical bore. In this case, pin 112 is pressed into a bore within shaft 106 and protrudes from the shaft and engages with aperture 114 formed by retainer 108. The aperture 114 is dimensioned to permit the appropriate degree of angular relative rotation designated by angle α as the case of the previously described embodiment. This angle α is selected to allow the locking engagement previously described to occur.

Figure 14:
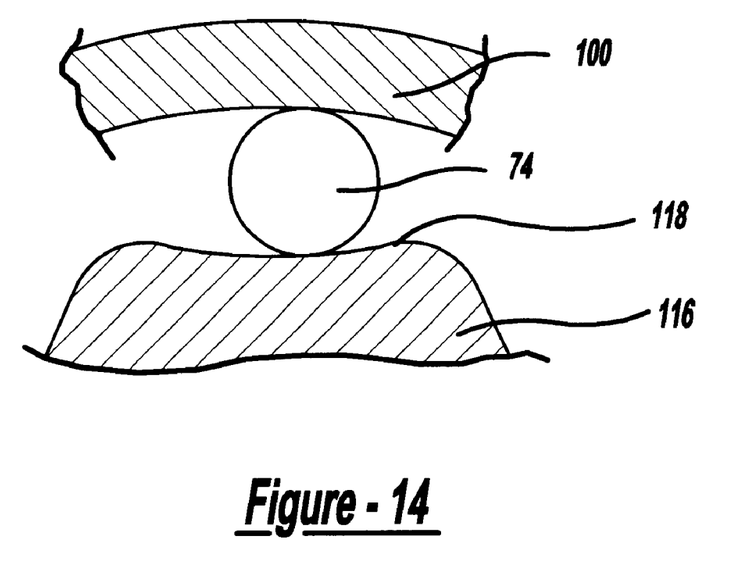
FIG. 14 is a partial cross-sectional view through a representative non-reversing clutch assembly in accordance with this invention showing an alternate configuration of a roller engaging surface.

FIG. 14 illustrates an alternate embodiment of shaft 116 which could replace shafts 106 or 90. In this instance, the flat cam surfaces are replaced by surfaces 118 with a concave shape which engage with rollers 74. By making the surface 118 slightly concave instead of flat, less relative angular rotation (α) is required to engage rollers 74 between the shaft and outer race 100, thereby reducing the relative rotation of "lash" in the assembly. This geometry also allows rollers 74 to disengage more easily, reducing the response time and torque required when the associated motor starts to drive the system. A further benefit of this configuration is that the slightly higher engagement angle reduces the internal stresses in the clutch. However, the curvature of surface 118 needs to be carefully controlled to keep the contact angle in the proper range where the clutch locks firmly without slipping. Surface 118 may be formed of various shapes including semicircular or a smooth blending of varying radii.

While the above description constitutes the preferred embodiment of the present invention, it will be appreciated that the invention is susceptible to modification, variation and change without departing from the proper scope and fair meaning of the accompanying claims.

We claim:

1. A position adjusting system for adjusting a position of a seat in a vehicle and preventing movement of the seat resulting from external forces acting on the seat, the apparatus comprising:
   a seat track fixable to the vehicle;
   a motor actuator;
   a gear train engaged with the motor actuator and the seat track and adapted to cooperate with the seat track to convert movement of the motor actuator into movement of the seat track and the seat; and
   a non-reversing clutch mechanism having rolling elements including a circular cross-section contacting a race, the non-reversing clutch mechanism being coupled to the gear train and adapted to transfer torque from the motor actuator through the gear train to move the seat upon actuation of the motor actuator, the rolling elements being configured to roll against the race as the motor actuator is actuated, the non-reversing clutch mechanism causing the rolling elements to lock with the race upon torque being applied through the seat track, thereby preventing the external forces acting on the seat from moving the seat relative to the vehicle.

2. The position adjusting system of claim 1, wherein the gear train contains a pinion gear engaging with a toothed rack of the seat track.

3. The position adjusting system of claim 1, wherein the movement of the seat is linear along the seat track in a fore-and-aft direction.

4. The position adjusting system of claim 1, wherein the gear train includes a worm driven by the motor actuator and a worm gear meshing with the worm.

5. The position adjusting system of claim 1 wherein the non-reversing clutch includes an outer race having an inner cylindrical surface, a shaft having cam surfaces, a plurality of rolling elements having a circular cross-section positioned radially between the shaft cam surfaces and the outer race inner cylindrical surface and a retainer having tangs interspaced between the rolling elements, means for limiting the degree of angular rotation between the shaft and the retainer and wherein the retainer is driven for rotation by the motor actuator and the shaft is coupled with the seat track, whereby rotation of the motor actuator causes rotation of the retainer which interacts with the rolling elements, causing the rolling elements to roll as the retainer and the shaft rotate relative to the outer race, and rotation of the shaft by the external forces on the seat causes the shaft cam surfaces to urge the rolling elements into locking engagement with the outer race thereby preventing rotation of the motor actuator.

6. The position adjusting system of claim 5 further comprising a spring interfitting between the retainer tangs and the rolling elements.

7. The position adjusting system of claim 5 wherein the means for limiting the degree of angular rotation between the shaft and the retainer comprises the retainer having a generally "D" shaped interior surface and the shaft having a generally "D" shaped outer surface closely interfitting with the retainer interior cavity.

8. The position adjusting system of claim 5 wherein the means for limiting and controlling the degree of angular rotation between the shaft and the retainer comprises the retainer having a non-circular interior surface and the shaft having an exterior surface corresponding with the retainer interior surface.

9. The position adjusting system of claim 5 wherein the retainer interior surface and the shaft having a regular polygonal cross-sectional shape.

10. The position adjusting system of claim 9 wherein the retainer interior surface and the shaft exterior surface are hexagonal.

11. The position adjusting system of claim 5 wherein the means for limiting and controlling the degree of angular rotation between the shaft and the retainer and enabling the retainer to drive the shaft comprises the shaft having a radial bore and the retainer and enabling the retainer to drive the shaft having a slot in alignment with the bore and a pin received by the bore and passing through the slot.

12. The position adjusting system of claim 5 wherein the shaft cam surfaces are flat.

13. The position adjusting system of claim 5 wherein the shaft cam surfaces are concave.

14. A position adjusting system for adjusting a position of a seat in a vehicle and preventing movement of the seat resulting from external forces acting on the seat, the apparatus comprising:
   a seat track fixable to the vehicle;
   a motor actuator;
   a gear train engaged with the motor actuator and the seat track and adapted to cooperate with the seat track to convert movement of the motor actuator into movement of the seat track and the seat; and
   a non-reversing clutch mechanism coupled with the gear train and adapted to transfer torque from the motor actuator through the gear train to move the seat upon actuation of the motor actuator but locking upon torque being applied through the seat track, thereby preventing the external forces acting on the seat from moving the seat relative to the vehicle, the non-reversing clutch including a race having an inner cylindrical surface, a shaft having cam surfaces, a plurality of rolling elements having a circular cross-section positioned radially between the shaft cam surfaces and the race inner cylindrical surface and a retainer having tangs interspaced between the rolling elements, means for limiting the degree of angular rotation between the shaft and the retainer and enabling torque to be transferred between the retainer and the shaft and wherein the retainer is driven for rotation by the motor actuator end the shaft is coupled with the seat track, whereby rotation of the motor actuator causes rotation of the retainer which interact with the rolling elements and cause them to roll as the retainer and the shaft to rotate relative to the race, and rotation of the shaft by the external forces on the seat causes the shaft cam surfaces to urge the rolling elements into locking engagement with the eutei race thereby preventing rotation of the motor actuator.

15. The position adjusting system of claim 14 further comprising a spring interfitting between the retainer fangs and the roiling elements.

16. The position adjusting system of claim 14 wherein the means for limiting the degree of angular rotation between the shaft and the retainer comprises the retainer having a generally "D" shaped interior surface and the shaft having a generally "D" shaped outer surface closely interfitting with the retainer interior cavity.

17. The position adjusting system of claim 16 wherein the retainer interior surface and the shaft having a regular polygonal cross-sectional shape.

18. The position adjusting system of claim 14 wherein the means for limiting the degree of angular rotation between the shaft and the retainer comprises the retainer having a regular polygonal interior surface and the shaft having a regular polygonal exterior surface corresponding with the retainer interior surface.

19. The position adjusting system of claim 14 wherein the retainer interior surface and the shaft exterior surface are hexagonal.

20. The position adjusting system of claim 14 wherein the means for limiting the degree of angular rotation between the shaft and the retainer comprises the shaft having a radial bore and the retainer having a slot in alignment with the bore and a pin received by the bore and passing through the slot.

21. The position adjusting system of claim 14 wherein the shaft cam surfaces are flat.

22. The position adjusting system of claim 14 wherein the shaft cam surfaces are concave.

* * * * *

UNITED STATES PATENT AND TRADEMARK OFFICE
CERTIFICATE OF CORRECTION

PATENT NO. : 6,762,579 B2
DATED : July 13, 2004
INVENTOR(S) : Bryce W. Babcock, Russell E. Monahan and William V. Alcini It is certified that error appears in the above-identified patent and that said Letters Patent is hereby corrected as shown below:

Title page,
Item [57], ABSTRACT,
Line 2, change "n" to -- in --.

Column 7,
Line 19, delete "eutei".
Line 22, change "fangs" to -- tangs --.

Signed and Sealed this

Sixteenth Day of November, 2004

JON W. DUDAS
*Director of the United States Patent and Trademark Office*